US 9,553,435 B2

(12) United States Patent
Manahan et al.

(10) Patent No.: US 9,553,435 B2
(45) Date of Patent: Jan. 24, 2017

(54) MANIFOLD FOR CONTROLLING AIRFLOW WITHIN AN EXPLOSION-PROOF ENCLOSURE

(75) Inventors: Joseph Michael Manahan, Manlius, NY (US); Graig E. DeCarr, Cicero, NY (US)

(73) Assignee: Cooper Technologies Company, Houston, TX (US)

( * ) Notice: Subject to any disclaimer, the term of this patent is extended or adjusted under 35 U.S.C. 154(b) by 995 days.

(21) Appl. No.: 13/331,424

(22) Filed: Dec. 20, 2011

(65) Prior Publication Data

US 2012/0164933 A1 Jun. 28, 2012

Related U.S. Application Data

(60) Provisional application No. 61/426,405, filed on Dec. 22, 2010.

(51) Int. Cl.
*F24F 7/007* (2006.01)
*H02G 3/08* (2006.01)
*F24F 3/16* (2006.01)

(52) U.S. Cl.
CPC ............ *H02G 3/088* (2013.01); *F24F 3/1603* (2013.01)

(58) Field of Classification Search
CPC ............................... H02G 3/088; F24F 3/1603
USPC ........ 454/184, 251, 341, 188, 191, 193, 194
See application file for complete search history.

(56) References Cited

U.S. PATENT DOCUMENTS

| 2,801,768 A | * | 8/1957 | Immel | ..................... H01H 9/043 220/88.2 |
| 2,917,384 A | * | 12/1959 | Grandey | .......................... 419/14 |
| 4,158,875 A | | 6/1979 | Tajima et al. | |
| 4,180,177 A | * | 12/1979 | Gunderman | ............. A62C 3/00 220/230 |
| 4,328,901 A | | 5/1982 | Gunderman et al. | |
| 4,909,315 A | | 3/1990 | Nelson et al. | |
| 5,237,484 A | | 8/1993 | Ferchau et al. | |

(Continued)

FOREIGN PATENT DOCUMENTS

EP 1729202 A1 * 12/2006 ............... G06F 1/20
JP 2006243635 9/2006

OTHER PUBLICATIONS

English Machine Translation of EP1729202A1.*

(Continued)

*Primary Examiner* — Gregory Huson
*Assistant Examiner* — Dana Tighe
(74) *Attorney, Agent, or Firm* — King & Spalding LLP

(57) ABSTRACT

A manifold within an explosion-proof enclosure is described herein. The manifold can include an inlet duct coupled to an air moving device, where the inlet duct can receive exhaust air from the air moving device. The manifold can further include an outlet duct that includes a perimeter and at least one channel, where the outlet duct can send the exhaust air outside the explosion-proof enclosure, where the perimeter of the outlet duct is coupled to a first portion of an inner surface of an outer wall of the explosion-proof enclosure, and where the first portion of the inner surface includes at least one aperture that traverses the outer wall. The manifold can also include a body that includes a cavity, where the body couples the inlet duct to the at least one channel, and where the exhaust air flows from the inlet duct through the cavity to the outlet duct.

19 Claims, 9 Drawing Sheets

(56) References Cited

U.S. PATENT DOCUMENTS

| | | | |
|---|---|---|---|
| 5,657,641 | A | 8/1997 | Cunningham et al. |
| 5,914,858 | A | 6/1999 | McKeen et al. |
| 6,294,721 | B1 | 9/2001 | Oravetz et al. |
| 6,369,319 | B1 | 4/2002 | Nagashima et al. |
| 6,392,322 | B1 | 5/2002 | Mares et al. |
| 6,525,936 | B2 | 2/2003 | Beitelmal et al. |
| 6,533,031 | B1 | 3/2003 | Garcia et al. |
| 6,574,105 | B2 | 6/2003 | Nakano et al. |
| 6,657,863 | B2 * | 12/2003 | Lee et al. ............ 361/697 |
| 6,708,834 | B2 | 3/2004 | Hagerman, III |
| 6,776,706 | B2 | 8/2004 | Kipka et al. |
| 6,900,387 | B2 | 5/2005 | Gravell et al. |
| 6,900,565 | B2 | 5/2005 | Preston |
| 6,953,491 | B2 | 10/2005 | Goyetche |
| 7,016,193 | B1 | 3/2006 | Jacques et al. |
| 7,310,228 | B2 | 12/2007 | Chen |
| 7,361,081 | B2 | 4/2008 | Beitelmal et al. |
| 7,397,665 | B2 | 7/2008 | Yuval |
| 7,505,269 | B1 | 3/2009 | Cosley et al. |
| 7,508,664 | B2 | 3/2009 | Holland |
| 7,611,402 | B2 * | 11/2009 | McClellan et al. ......... 454/184 |
| 7,752,858 | B2 | 7/2010 | Johnson et al. |
| 7,755,889 | B2 | 7/2010 | Vinson et al. |
| 2006/0202045 | A1 * | 9/2006 | Liu ............................ 236/49.3 |
| 2007/0056307 | A1 | 3/2007 | Caggiano |
| 2007/0095554 | A1 * | 5/2007 | Noda ............................ 174/55 |
| 2007/0231677 | A1 * | 10/2007 | Stocchiero ................. 429/53 |
| 2007/0259616 | A1 | 11/2007 | Scattolin et al. |
| 2007/0285889 | A1 * | 12/2007 | Watson et al. ............. 361/695 |
| 2008/0060371 | A1 | 3/2008 | Jude |
| 2008/0101016 | A1 | 5/2008 | Brooks et al. |
| 2008/0137296 | A1 | 6/2008 | DuQuette et al. |
| 2008/0256693 | A1 * | 10/2008 | Mickleson et al. ........... 4/216 |
| 2009/0097202 | A1 | 4/2009 | Gipson |
| 2009/0253360 | A1 | 10/2009 | Tafoya |
| 2009/0318071 | A1 | 12/2009 | Nemoz et al. |
| 2010/0284150 | A1 | 11/2010 | Manahan et al. |
| 2010/0288467 | A1 | 11/2010 | Manahan et al. |
| 2010/0311316 | A1 | 12/2010 | Tindale et al. |
| 2010/0317279 | A1 | 12/2010 | Yatskov |
| 2011/0120067 | A1 | 5/2011 | Kim |
| 2011/0141684 | A1 | 6/2011 | Klarer |
| 2011/0197767 | A1 | 8/2011 | Seitz |

OTHER PUBLICATIONS

Crouse-Hinds by Eaton, Article 500-516 of the National Electrical Code with Product Recommendations for Use in Hazardous (Classified) Areas, Eaton's Crouse-Hinds 2014 Code Digest, Jan. 2014, pp. 1-128, Eaton Corporation, Cleveland, Ohio.

NEMA, Nema Enclosure Types, Nov. 2005, 9 pages, National Electrical Manufacturers Association.

* cited by examiner

MANIFOLD FOR CONTROLLING AIRFLOW WITHIN AN EXPLOSION-PROOF ENCLOSURE

CROSS-REFERENCE TO RELATED APPLICATIONS

This application claims priority under 35 U.S.C. §119 to U.S. Provisional Patent Application Ser. No. 61/426,405, titled "Manifold for Controlling Airflow Within An Explosion-Proof Enclosure" and filed on Dec. 22, 2010, the entire contents of which are hereby incorporated herein by reference.

The present application also is related to an application having U.S. patent application Ser. No. 13/331,331 and entitled "Controlling Airflow Within an Explosion-Proof Enclosure" in the names of Joseph Michael Manahan and Graig E. DeCarr, the entire contents of which are hereby incorporated herein by reference.

TECHNICAL FIELD

The present disclosure relates generally to a manifold for controlling airflow within an explosion-proof enclosure, and more particularly to systems, methods, and devices using a manifold to control airflow to reduce temperature within an explosion-proof enclosure that includes heat-producing equipment.

BACKGROUND

Explosion-proof receptacle housings and enclosure systems are used in many different industrial applications. Such explosion-proof receptacle housing and enclosure systems may be used, for example, in military applications, onboard ships, assembly plants, power plants, oil refineries, petrochemical plants, and other harsh environments. At times, the equipment located inside such explosion-proof receptacle housing and enclosure systems are used to control motors and other industrial equipment.

Traditional motor starters and related equipment fail to provide adequate torque control and result in excessive wear on the motor and associated equipment. Instead, variable frequency drives (VFDs) are often used in place of traditional motor starters. However, VFDs tend to generate heat and are subject to failure when exposed to excessive temperatures caused by the heat loss. A common practice to reduce heat-related problems is to remove the VFD to a remote location so that a explosion-proof receptacle housing and enclosure system is not required, allowing proper cooling of the VFD during operation. However, installation costs may increase and operational problems may result from increased line losses from the added distance that signals between the VFD and the related equipment must travel.

SUMMARY

In general, in one aspect, the disclosure relates to a manifold within an explosion-proof enclosure. The manifold can include an inlet duct coupled to an air moving device, where the inlet duct can receive exhaust air from the air moving device. The manifold can further include an outlet duct that includes a perimeter and at least one channel, where the outlet duct can send the exhaust air outside the explosion-proof enclosure, where the perimeter of the outlet duct is coupled to a first portion of an inner surface of an outer wall of the explosion-proof enclosure, and where the first portion of the inner surface includes at least one aperture that traverses the outer wall. The manifold can also include a body that includes a cavity, where the body couples the inlet duct to the at least one channel, and where the exhaust air flows from the inlet duct through the cavity to the outlet duct.

In another aspect, the disclosure can generally relate to a method for controlling flow of exhaust air through an enclosure using a manifold. The method can include receiving, using an inlet duct of the manifold located inside an explosion-proof enclosure, the exhaust air from an air moving device. The method can also include channeling, through a body of the manifold and using a positive pressure created by a seal formed against a portion of an inner surface of an outer wall of the explosion-proof enclosure, the exhaust air toward the outer wall of the explosion-proof enclosure. The method can further include sending, through an outlet duct of the manifold, the exhaust air through at least one aperture in the outer wall of the explosion-proof enclosure, where the at least one aperture in the outer wall of the explosion-proof enclosure is located within the portion of the inner surface of the outer wall.

These and other aspects, objects, features, and embodiments of the present invention will be apparent from the following description and the appended claims.

BRIEF DESCRIPTION OF THE DRAWINGS

The drawings illustrate only exemplary embodiments of a manifold for controlling airflow within an explosion-proof enclosure and are therefore not to be considered limiting of its scope, as the disclosure may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
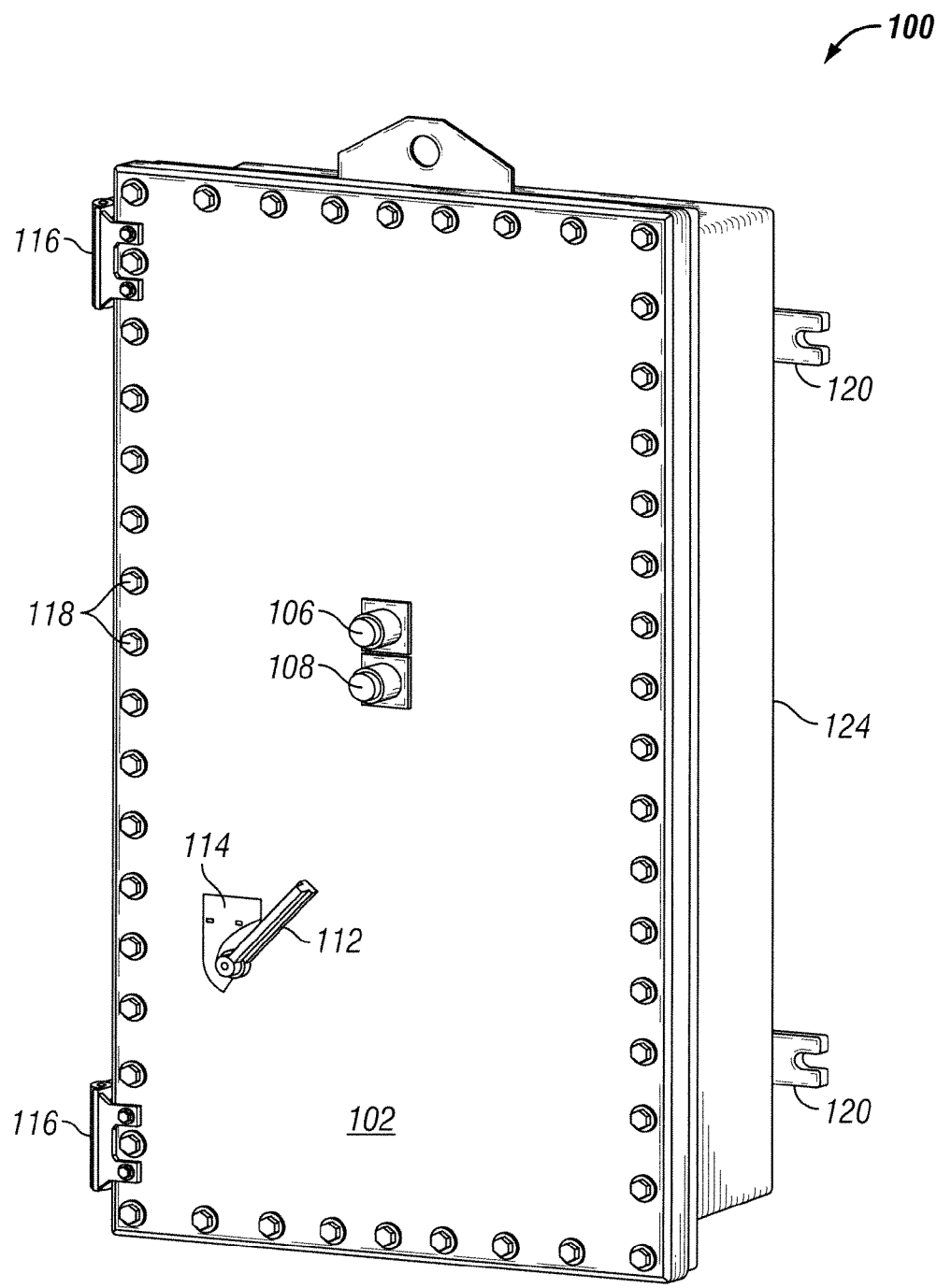
FIGS. 1 and 2 show explosion-proof enclosures in which one or more exemplary embodiments of a manifold for controlling airflow may be implemented.

Exemplary embodiments of a manifold for controlling airflow within an explosion-proof enclosure will now be described in detail with reference to the accompanying figures. Like elements in the various figures are denoted by like reference numerals for consistency.

In the following detailed description of exemplary embodiments of a manifold for controlling airflow within an explosion-proof enclosure, numerous specific details are set forth in order to provide a more thorough understanding of a manifold for controlling airflow within an explosion-proof enclosure. However, it will be apparent to one of ordinary skill in the art that a manifold for controlling airflow within an explosion-proof enclosure may be practiced without these specific details. In other instances, well-known features have not been described in detail to avoid unnecessarily complicating the description. Further, certain descriptions (e.g., top, bottom, side, end, interior, inside) are merely intended to help clarify aspects of a manifold for controlling airflow within an explosion-proof enclosure and are not meant to limit embodiments of a manifold for controlling airflow within an explosion-proof enclosure.

In general, exemplary embodiments of a manifold for controlling airflow within an explosion-proof enclosure provide systems, methods, and devices for using a manifold to receive exhaust air from an air moving device located within an explosion-proof enclosure and channeling the exhaust air outside of the explosion-proof enclosure. Specifically, exemplary embodiments of a manifold for controlling airflow within an explosion-proof enclosure provide for creating a seal with an outer wall of the explosion-proof enclosure, where the seal generates a positive pressure to induce the air to flow from the air moving device, through the manifold, and out of the explosion-proof enclosure.

While the exemplary embodiments discussed herein are with reference to explosion-proof enclosures, other types of non-explosion-proof enclosures (e.g., junction boxes, control panels, lighting panels, motor control centers, switchgear cabinets, relay cabinets) or any other type of enclosure may be used in conjunction with exemplary embodiments of a manifold for controlling airflow.

A user may be any person that interacts with the explosion-proof enclosure or equipment controlled by one or more components of the explosion-proof enclosure. Specifically, a user may program, operate, and/or interface with one or more components (e.g., an air moving device controller, a VFD) associated with a manifold for controlling airflow within an explosion-proof enclosure. Examples of a user may include, but are not limited to, an engineer, an electrician, an instrumentation and controls technician, a mechanic, an operator, a consultant, a contractor, and a manufacturer's representative.

In one or more exemplary embodiments, heat-generating components (discussed below) inside the explosion-proof enclosure are any components that produce heat energy during operation. Such a component may include, but is not limited to, one or more of a device (e.g., VFD, sensor, control panel, circuit board, relay), a terminal, cable, wiring, a switch, a handle, an indicating light, a duct, and conduit.

In one or more exemplary embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more exemplary embodiments, an explosion-proof enclosure is subject to meeting certain standards and/or requirements. For example, the National Electrical Manufactures Association (NEMA) sets standards by which an enclosure must comply in order to qualify as an explosion-proof enclosure. Specifically, NEMA Type 7, Type 8, Type 9, and Type 10 enclosures set standards by which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (e.g., UL 698). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Figure 2:
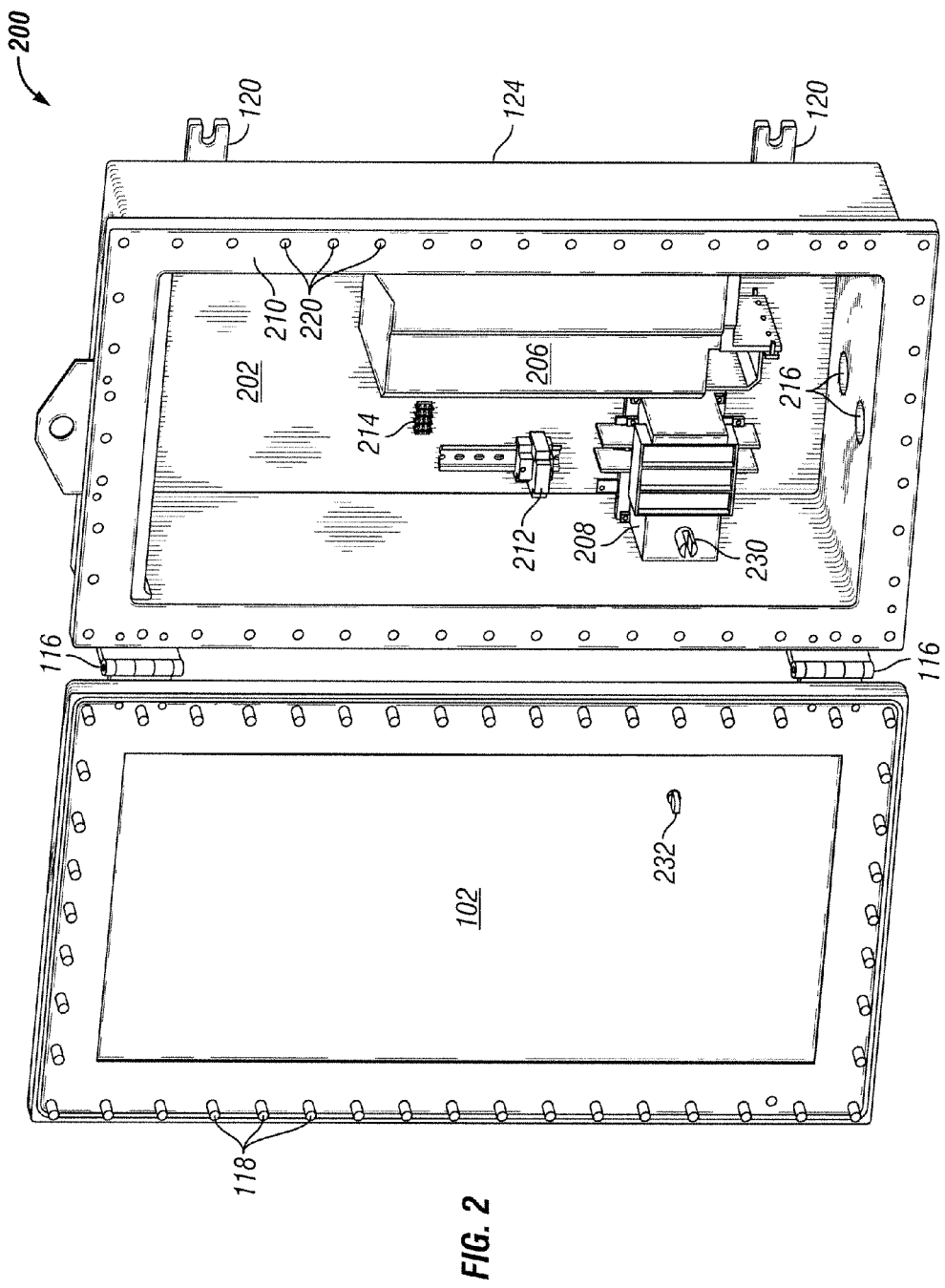

FIGS. 1 and 2 depict an explosion-proof enclosure 100 in which one or more exemplary embodiments of a manifold for controlling airflow within an explosion-proof enclosure may be implemented. In one or more exemplary embodiments, one or more of the components shown in FIGS. 1 and 2 may be omitted, repeated, and/or substituted. Accordingly, exemplary embodiments of an explosion-proof enclosure should not be considered limited to the specific arrangements of components shown in FIGS. 1 and 2.

Referring now to FIG. 1, an example of an explosion-proof enclosure 100 in a closed position is shown. The enclosure cover 102 is secured to the enclosure body 124 by a number of fastening devices 118 located at a number of points around the perimeter of the enclosure cover 102. In one or more exemplary embodiments, a fastening device 118 may be one or more of a number of fastening devices, including but not limited to a bolt (which may be coupled with a nut), a screw (which may be coupled with a nut), and a clamp. In addition, one or more hinges 116 are secured to one side of the enclosure cover 102 and a corresponding side of the enclosure body 124 so that, when all of the fastening devices 118 are removed, the enclosure cover 102 may swing outward (i.e., an open position) from the enclosure body 124 using the one or more hinges 116. In one or more exemplary embodiments, there are no hinges, and the enclosure cover 102 is separated from the enclosure body 124 when all of the fastening devices 118 are removed.

The enclosure cover 102 and the enclosure body 124 may be made of any suitable material, including metal (e.g., alloy, stainless steel), plastic, some other material, or any combination thereof. The enclosure cover 102 and the enclosure body 124 may be made of the same material or different materials.

In one or more exemplary embodiments, on the end of the enclosure body 124 opposite the enclosure cover 102, one or more mounting brackets 120 are affixed to the exterior of the enclosure body 124 to facilitate mounting the enclosure 100. Using the mounting brackets 120, the enclosure 100 may be mounted to one or more of a number of surfaces and/or elements, including but not limited to a wall, a control cabinet, a cement block, an I-beam, and a U-bracket.

The enclosure cover 102 may include one or more features that allow for user interaction while the enclosure 100 is sealed in the closed position. As shown in FIG. 1, one or more indicating lights (e.g., indicating light 1 106, indicting light 2 108) may be located on the enclosure cover 102. Each indicating light may be used to indicate a status of a feature or process associated with equipment inside the enclosure 100. For example, an indicating light may show a constant green light if a motor controlled by a VFD inside the enclosure 100 is operating. As another example, an indicating light may flash red when a motor controlled by a VFD inside the enclosure 100 has a problem (e.g., tripped circuit, VFD overheats, overcurrent situation). As another example, an indicating light may show a constant red light when an electromagnetic pulse caused by an explosion inside the enclosure 100 has resulted. An indicating light may be made of one or more materials (e.g., glass, plastic) using one or more different lighting sources (e.g., light-emitting diode (LED), incandescent bulb).

In one or more exemplary embodiments, the enclosure cover 102 may also include a switch handle 112 that allows a user to operate a switch (not shown) located inside the explosion-proof enclosure 100 while the explosion-proof enclosure 110 is closed. Those skilled in the art will appreciate that the switch handle 112 may be used for any type of switch. Each position (e.g., OFF, ON, HOLD, RESET) of the switch may be indicated by a switch position indicator 114 positioned adjacent to the switch handle 112 on the outer surface of the enclosure cover 102. A switch associated with the switch handle 112 and the switch position indicator 114 may be used to electrically and/or mechanically isolate, and/or change the mode of operation of, one or more components inside or associated with the explosion-proof enclosure 100. For example, the switch handle 112 may point to "OFF" on the switch position indicator 114 when a disconnect switch located inside the explosion-proof enclosure 100 is disengaged. In such a case, all equipment located inside the explosion-proof enclosure 100, as well as the equipment (e.g., a motor) controlled by the equipment located inside the explosion-proof enclosure 100, may be without power.

Referring now to FIG. 2, an example of an explosion-proof enclosure 100 in an open position in accordance with one or more exemplary embodiments is shown. The explosion-proof enclosure 100 is in the open position because the enclosure cover (not shown) is not secured to the enclosure body 124. The hinges 116 attached to the left side of the enclosure body 124 are also attached to the left side of the enclosure cover, which is swung outward from the enclosure body 124. Because the explosion-proof enclosure 100 is in the open position, the components of the explosion-proof enclosure 100 are visible to a user.

As described above with respect to FIG. 1, the enclosure body 124 includes two or more mounting brackets 120. In addition, in one or more exemplary embodiments, the enclosure body 124 includes an enclosure engagement surface 210, against which the enclosure cover meets when the explosion-proof enclosure 100 is in the closed position. A number of fastening device apertures 220 are shown around the enclosure engagement surface 210, where each of the fastening device apertures 220 are configured to receive a fastening device 118 that traverses through the enclosure cover 102, as described above with respect to FIG. 1. The number of fastening device apertures 220 may vary, depending on one or more of a number of factors, including but not limited to the size of the fastening device apertures 220, a standard that the explosion-proof enclosure 100 meets, and the type of fastening device 118 used. The number of fastening device apertures 220 may be zero.

In one or more exemplary embodiments, the explosion-proof enclosure 100 of FIG. 2 includes a mounting plate 202 that is affixed to the back of the inside of the explosion-proof enclosure 100. The mounting plate 202 may be configured to receive one or more components such that the one or more components are affixed to the mounting plate 202. The mounting plate 202 may include one or more apertures configured to receive securing devices that may be used to affix a component to the mounting plate 202. The mounting plate 202 may be made of any suitable material, including but not limited to the material of the enclosure body 124. In one or more exemplary embodiments, some or all of the one or more components may be mounted directly to an inside wall of the explosion-proof enclosure 100 rather than to the mounting plate 202.

In one or more exemplary embodiments, a VFD 206 is affixed to the mounting plate 202 inside the explosion-proof enclosure 100. The VFD 206 may include any components used to drive a motor and/or other device using variable control signals for controlled starts, stops, and/or operations of the motor and/or other devices. Examples of components of a VFD include, but are not limited to, discrete relays, a programmable logic controller (PLC), a programmable logic relay (PLR), an uninterruptible power supply (UPS), and a distributed control system (DCS). In one or more exemplary embodiments, one or more components of the VFD may replace the VFD. For example, the VFD may be substituted by one or more PLCs, one or more PLRs, one or more UPSs, one or more DCSs, and/or other heat-generating components.

In one or more exemplary embodiments, a switch 208 is affixed to the mounting plate 202 inside the explosion-proof enclosure 100. The switch 208 may be configured to electrically and/or mechanically isolate, and/or change the mode of operation of, one or more components located inside the explosion-proof enclosure 100 and/or one or more components located outside the explosion-proof enclosure 100. The switch 208 may be any type of switch, including but not limited to a disconnect switch, a test switch, a reset switch, an indicator switch, and a relay switch. For example, the switch 208 may be a disconnect switch that is used to cut off power to all components in the explosion-proof enclosure 100 and all devices located outside the explosion-proof enclosure 100 that are controlled by the components inside the explosion-proof enclosure 100. As another example, the switch 208 may be a bypass switch that is used to deactivate a protection scheme (e.g., a relay) or some other particular component or group of components located inside the explosion-proof enclosure 100.

The switch 208 may further be configured to receive, through mechanical and/or electrical means, a directive to change states (e.g., open, closed, hold) from a component located on the enclosure cover. For example, if the enclosure cover includes a switch handle (as described above with respect to FIG. 1), then a switch handle shaft 232 may extend from the switch handle through the enclosure cover to a switch coupling 230 of the switch 208. When the explosion-proof enclosure 100 is in the closed position, the switch handle shaft 232 couples with the switch coupling 230, and switch 208 may be operated by operating the switch handle located outside the explosion-proof enclosure, as described above with respect to FIG. 1.

In one or more exemplary embodiments, one or more relays (e.g., relay 212) are affixed to the mounting plate 202 inside the explosion-proof enclosure 100. A relay 212 may be configured to control one or more operations of one or more components located in, or associated with, the explosion-proof enclosure 100. Specifically, a relay 212 may, through one or more relay contacts, allow electrical current to flow and/or stop electrical current from flowing to one or more components in the enclosure 100 based on whether a coil of the relay 212 is energized or not. For example, if the coil of the relay 212 is energized, then a contact on the relay may be closed to allow current to flow to energize a motor. The relay 212 may be activated based on a timer, a current, a voltage, some other suitable activation method, or any combination thereof. The relay 212 may also be configured to emit a signal when a condition has occurred. For example, the relay 212 may flash a red light to indicate that the VFD 206 is in an alarm state.

In one or more exemplary embodiments, wiring terminals 214 are affixed to the mounting plate 202 inside the explosion-proof enclosure 100. Wiring terminals 214 are a series of terminals where one terminal is electrically connected to at least one other terminal in the series of terminals while remaining electrically isolated from the remaining terminals in the series of terminals. In other words, two or more terminals among the series of terminals act as a junction point where multiple wires may be electrically connected through the joined terminals.

In one or more exemplary embodiments, one or more entry holes 216 may extend through one or more sides (e.g., bottom) of the enclosure body 124. Each entry hole 216 may be configured to allow cables and/or wiring for power, control, and/or communications to pass through from outside the explosion-proof enclosure 100 to one or more components inside the explosion-proof enclosure 100. An entry hole 216 may be joined with a conduit and coupling from outside the explosion-proof enclosure 100 to protect the cables and/or wiring received by the entry hole 216 and to help maintain the integrity of the explosion-proof enclosure 100 through the entry hole 216.

Figure 3A:
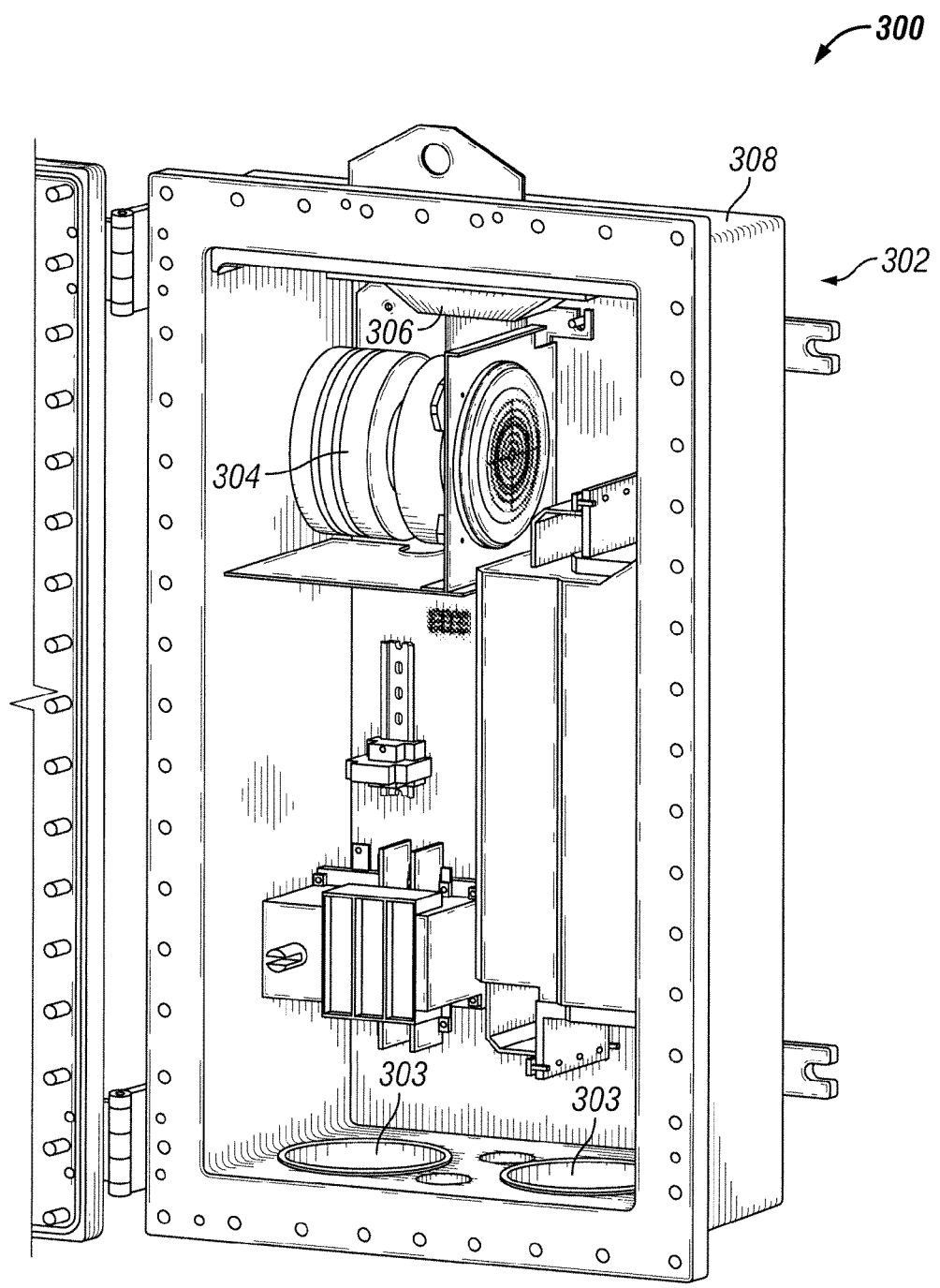
FIGS. 3A through 3C show a system that includes a manifold for controlling airflow within an explosion-proof enclosure in accordance with one or more exemplary embodiments.
Figure 3B:
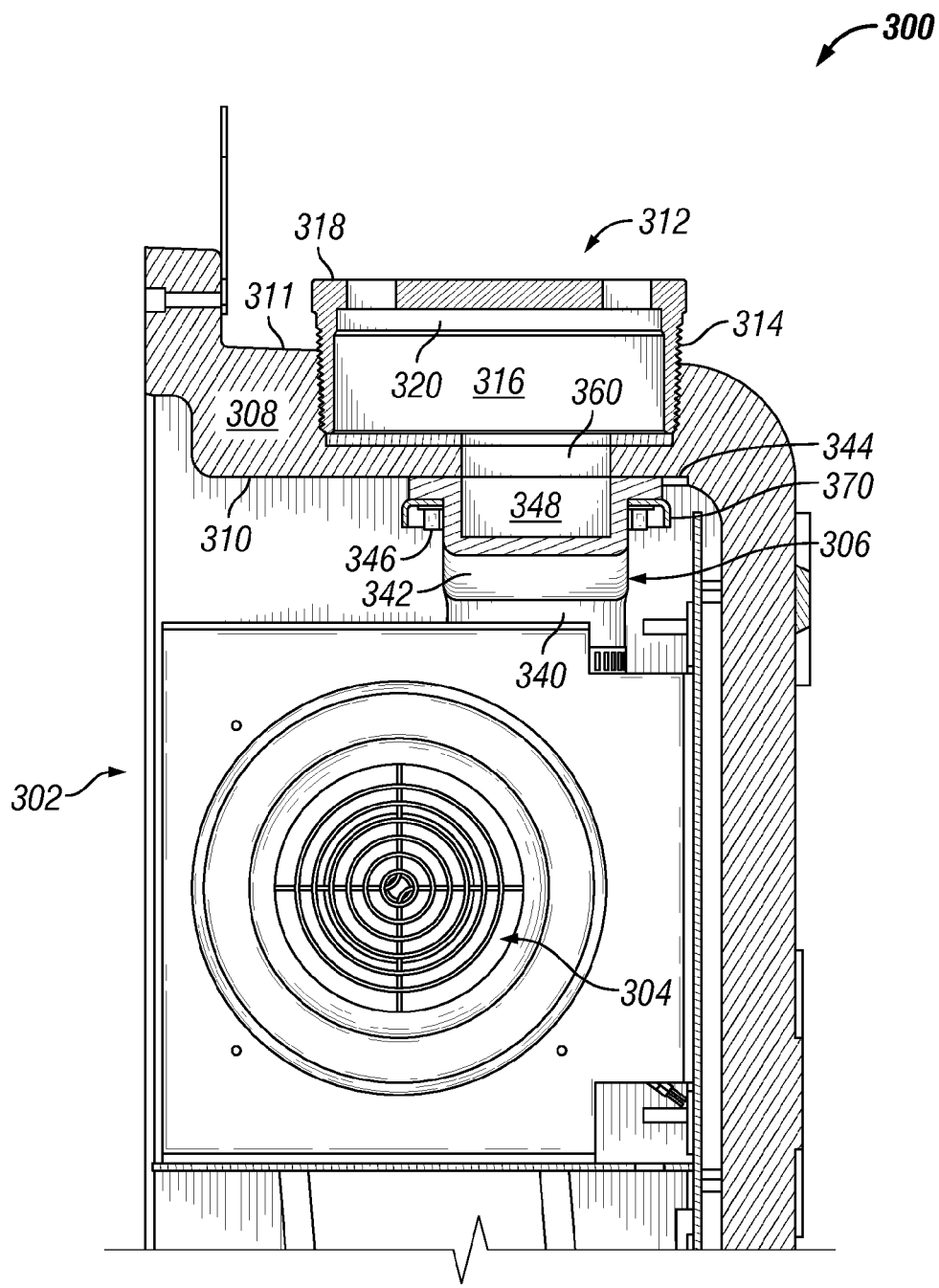
Figure 3C:
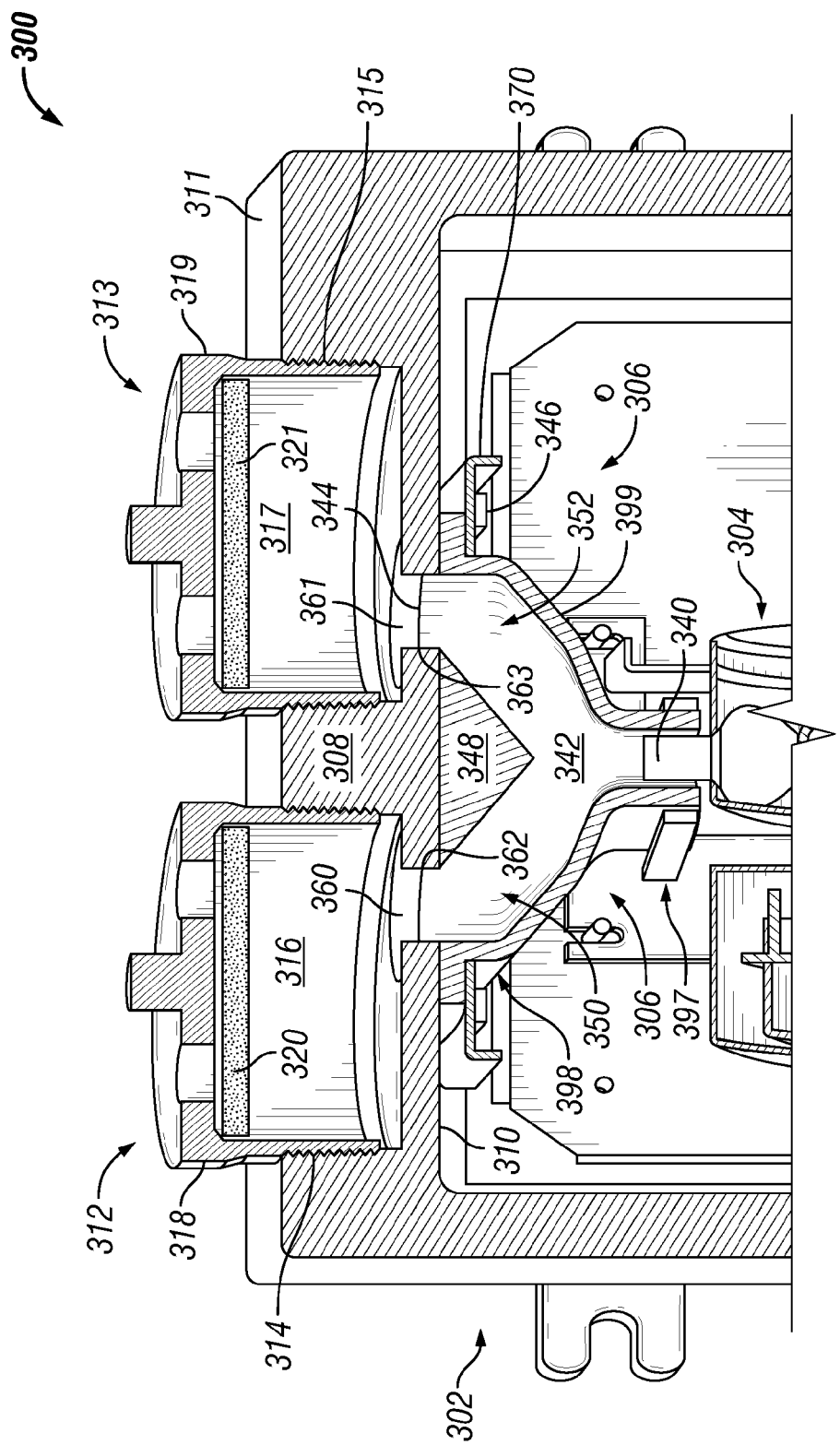

FIGS. 3A through 3C show an example system 300 of an explosion-proof enclosure in which airflow is controlled using a manifold 306 in accordance with one or more exemplary embodiments. Features shown but not described and/or labeled in FIGS. 3A through 3C are described and/or labeled above with respect to FIG. 2. Exemplary embodiments of a manifold for controlling airflow inside an explosion-proof enclosure are not limited to the configuration shown in FIGS. 3A through 3C and discussed herein.

FIG. 3A shows a system 300 that includes a manifold 306 for controlling airflow within an explosion-proof enclosure 302 in accordance with one or more exemplary embodiments. The system 300 of FIG. 3A includes an air moving device 304 that is positioned within the interior of the explosion-proof enclosure 302. The air moving device 304 may be a blower, a fan, or some similar device that is configured to move air. The air moving device 304 may include a motor that is used to control the flow of air (e.g., exhaust air) within the explosion-proof enclosure 302. The air moving device 304 may be configured to move air inside the explosion-proof enclosure 302. Specifically, the air moving device 304 may be configured to feed exhaust air from within the explosion-proof enclosure 302 into the manifold 306. The air moving device 304 may drive a differential pressure within the interior of the explosion-proof enclosure 302 to create the air flow. More than one air moving device 304 may be located and/or operating within the explosion-proof enclosure 302.

The exhaust air may be any air inside the explosion-proof enclosure 302. For example, the exhaust may be air that is used to cool heat-generating components (e.g., VFD, switch) located inside the explosion-proof enclosure 302. The exhaust air may originate as intake air. The air moving device 304 may draw intake air from outside the explosion-proof enclosure 302 through one or more intake apertures 303 in the explosion-proof enclosure 302. In one or more exemplary embodiments, the intake apertures 303 are incorporated with one or more air intake filter assemblies. Specifically, the air intake filter assembly may be coupled to an intake aperture 303 in a wall of the explosion-proof enclosure 302.

In such a case, as the air moving device 304 passes the intake air over the one or more heat-generating components, the intake air cools the heat-generating components. As the heat-generating components are cooled, the temperature of the intake air increases to generate exhaust air. In other words, the temperature of the exhaust air is greater than the temperature of the intake air. In one or more exemplary embodiments, the air moving device 304 is further configured to move the exhaust air into the manifold 306.

In one or more exemplary embodiments, the air moving device 304 operates continuously. Alternatively, the air moving device 304 may operate on a periodic basis. The periodic basis may be random, at a fixed interval, based on some operating parameter (e.g., the temperature inside the explosion-proof enclosure exceeds a threshold temperature), user preferences, some other suitable factor, or any combination thereof. The operation of the air moving device 304 may be controlled by one or more of a number of sources, including but not limited to a user (through manual operation) and an air moving device controller (not shown).

In one or more exemplary embodiments, the manifold 306 is coupled to the air moving device 304 (or each air moving device 304 if there are multiple air moving devices). The manifold 306 may be coupled to the air moving device 304 in one or more of any number of manners, including but not limited to using mating threads, bolting, welding, using epoxy, brazing, press fitting, mechanically connecting, using a flat joint, and using a serrated joint. The manifold 306 may be configured to direct some or all of the exhaust air outside the explosion-proof enclosure 302. The manifold 306 may form a seal between the air moving device 304 and a portion of the inner surface of an outer wall of the explosion-proof enclosure. By forming a seal, the manifold 306 may create and/or maintain a differential pressure (e.g., a positive pressure) to create air flow to remove the exhaust air from the explosion-proof enclosure 302.

The exhaust air inside the manifold 306 may exit the interior of the explosion-proof enclosure 302 through one or more outlet apertures (360 in FIG. 3B below) in an outer wall (308 in FIG. 3B below) of the explosion-proof enclosure 302. In one or more exemplary embodiments, each outlet aperture 360 extends through one or more sides (e.g., bottom) of the outer wall 308 of the explosion-proof enclosure 302. Each outlet aperture 360 may be configured to couple to an exhaust air filter assembly (described below with respect to FIGS. 3B and 3C) according to the configurations of the exhaust air filter assembly. For example, if an exhaust air filter assembly has a threaded body, then the outlet aperture 360 may be configured to have corresponding threads that mate with the threads of the exhaust air filter assembly.

FIG. 3B shows a cross-sectional side view of the system 300 of FIG. 3A. Specifically, FIG. 3B shows the air moving device 304 coupled to the inlet duct 340 disposed within a first (e.g., lower) end 397 of a housing 399 of the manifold 306. The inlet duct 340 disposed within the housing 399 may be configured to receive exhaust air from the air moving device 304. In one or more exemplary embodiments, there is one inlet duct 340 for each air moving device 304. Above the inlet duct 340 within the housing 399 of the manifold 306 is the body 342 of the manifold 306, above which is the outlet duct 344 disposed within a second (e.g., top) end 398 of the housing 399 of the manifold 306. In one or more exemplary embodiments, the body 342 disposed within the housing 399 of the manifold 306 is a cavity and is configured to couple the inlet duct 340 to the outlet duct 344 within the housing 399 of the manifold 306. The exhaust air may flow from the inlet duct 340 through the cavity to the outlet duct 344 of the manifold 306.

The second end 398 of the housing 399 (inside of which is disposed the outlet duct 344) may have a perimeter that defines an outer edge of the outlet duct 344. The perimeter of the second end 398 of the housing 399 may be coupled to a portion of the inner surface 310 of an outer wall 308 of the explosion-proof enclosure 302. The portion of the inner surface 310 may include one or more apertures 360 that traverse the outer wall 308 of the explosion-proof enclosure 302. The exhaust air may pass through the one or more apertures 360 to exit the explosion-proof enclosure 302.

In one or more exemplary embodiments, the manifold 306 (and, more specifically, the second end 398 of the housing 399 of the manifold 306) is secured to the outer wall 308 of the explosion-proof enclosure 302 using, at least in part, a bracket 370. The bracket 370 may be configured to overlap the perimeter of the second end 398 of the housing 399 of the manifold 306. The bracket 370 may have its own perimeter, which is larger than the perimeter of the second end 398 of the housing 399 of the manifold 306. The bracket 370 may be coupled to a larger portion of the inner surface 310 of the outer wall 308 of the explosion-proof enclosure 302. The portion of the inner surface 310 coupled to the bracket 370 may be larger than and encompass the portion of the inner surface 310 coupled to the outlet duct 344.

In one or more exemplary embodiments, the bracket 370 includes a number of fastening receivers (e.g., apertures, slots, hooks) (not shown). The fastening receivers in the bracket 370 may be positioned between the perimeter of the bracket 370 and the perimeter of the second end 398 of the housing 399 of the manifold 306. Each fastening receiver in the bracket 370 may be configured to receive a fastening device 346 (e.g., a bolt, a screw, a clamp). In one or more exemplary embodiments, the fastening devices 346 are configured to couple the bracket 370 and the second end 398 of the housing 399 of the manifold 306 to the inner surface 310 of the outer wall 308 of the explosion-proof enclosure 302. In this case, the bracket 370 may be coupled to the larger portion of the inner surface 310 of the outer wall 308 of the explosion-proof enclosure 302 using a number of fastening devices 346 that traverse the fastening receivers in the bracket 370.

In one or more exemplary embodiments, the bracket 370 forms a seal between the second end 398 of the housing 399 of the manifold 306 and the larger portion of the inner surface 310 of the outer wall 308 of the explosion-proof enclosure 302. The seal may create a positive pressure within the explosion-proof enclosure 302. The positive pressure may increase flow of the exhaust air through the manifold 306. The positive pressure may be at least 0.5 pounds per square inch. The positive pressure may be set and/or adjusted based on one or more parameters and/or one or more operating requirements. For example, the positive pressure may be set based on the amount of cooling (e.g., air flow) needed to maintain a desired temperature within the explosion-proof enclosure. In one or more exemplary embodiments, there is no bracket 370, in which case the second end 398 of the housing 399 of the manifold 306 includes one or more fastening receivers (e.g., apertures, hooks, slots) configured to receive fastening devices that couple the second end 398 of the housing 399 of the manifold 306 to the inner surface 310 of the outer wall 308.

In one or more exemplary embodiments, a gasket (shown in FIG. 4A below) is used to create and/or strengthen a seal between the perimeter of the second end 398 of the housing 399 of the manifold 306 and the smaller portion of the inner surface 310 of the outer wall 308 of the explosion-proof enclosure 302. A gasket (not shown) may also (or in the alternative) be used to create and/or strengthen the seal between the bracket 370 and the larger portion of the inner surface 310 of the outer wall 308 of the explosion-proof enclosure 302. In one or more exemplary embodiments, the gasket may include one or more fastening receivers (e.g., apertures). Fastening devices (e.g., fastening device 360) may be used to couple the second end 398 of the housing 399 of the manifold 306 and/or the bracket 370, through a gasket, to the inner surface 310 of the outer wall 308 of the explosion-proof enclosure 302 using the fastening receivers in the gasket.

In one or more exemplary embodiments, the outlet duct 344 disposed within the second end 398 of the housing 399 of the manifold 306 includes at least one channel (not shown in FIG. 3B). In such a case, the body 342 disposed within the housing 399 of the manifold 306 may be configured to couple the inlet duct 340 to each channel. When two or more channels exist in the outlet duct 344, the channels may be separated by one or more dividers 348. Each divider 348 can be disposed at the second end 398 of the housing 399 and may protrude from inside the perimeter of the outlet duct 344 toward the inlet duct 340. Each divider 348 may be shaped in one of any number of shapes, where the shape is designed to increase flow of the exhaust air by reducing turbulence while flowing to the outlet duct 344 of the manifold 306. In this case, the dividers 348 have planar walls that converge at a point within the cavity of the body 342 of the manifold 306.

In one or more exemplary embodiments, the outlet duct 344 disposed in the second end 398 of the housing 399 of the manifold is configured to send the exhaust air outside the explosion-proof enclosure 302. Specifically, the outlet duct 344 may be configured to send the exhaust air through the one or more apertures 360 in the outer wall 308 of the explosion-proof enclosure 302.

In one or more exemplary embodiments, at least one exhaust air filter assembly 312 is coupled to, and traverses, each aperture 360 in the outer wall 308 of the explosion-proof enclosure 302. The exhaust air filter assembly 312 may be configured to receive the exhaust air from the at least one channel of the outlet duct 344 and send the exhaust air outside of the explosion-proof enclosure 302. In one or more exemplary embodiments, the exhaust air filter assembly 312 (as well as the corresponding aperture to which the exhaust air filter assembly 312 traverses) is located within a portion of the inner surface 310 of the outer wall 308 encompassed by the perimeter of the second end 398 of the housing 399 of the manifold 306.

In one or more exemplary embodiments, the exhaust air filter assembly 312 is configured to remove contaminants from the exhaust air as the exhaust air passes from the outlet duct 344 disposed within the housing 399 of the manifold 306 to outside the explosion-proof enclosure 302. The exhaust air filter assembly 312 may also be configured to cool the exhaust air as the exhaust air passes from the outlet duct 344 disposed within the housing 399 of the manifold 306 to outside the explosion-proof enclosure 302. In such a case, the exhaust air sent outside the explosion-proof enclosure 302 may have a lower temperature than the temperature of the exhaust air entering the inlet duct 342 disposed within the housing 399 of the manifold 306. The exhaust air filter assembly 312 (and its components) may be coupled to the explosion-proof enclosure 302 in such a way, and assembled in such a way, as to meet the standards required for an explosion-proof enclosure. The exhaust air filter assembly 312 may include porous media (e.g., sintered material).

Each exhaust air filter assembly 312 may be configured in one of a number of different ways. In one or more exemplary embodiments, each exhaust air filter assembly 312 is configured to include a cavity 316 inside a frame 318 and a filter 320 (e.g., sintered material or other porous media) disposed within and coupled to the cavity 316. The frame 318 may include along its outer edges, threads 314 that mate with corresponding threads along the inner wall of the aperture 360. As a result, the air exhaust filter assembly 312 may be threadably coupled to the corresponding aperture 360 in the outer wall 308 of the explosion-proof enclosure 302. The frame 318 may also couple to the aperture 360 in one or more other ways, including but not limited to welding, compression fitting, and using a fastening device (e.g., bolt).

FIG. 3C shows a cross-sectional frontal view of the system 300 of FIG. 3A. Specifically, FIG. 3C shows the top portion of the air moving device 304 coupled to the inlet duct 340 disposed in the first end 397 of the housing 399 of the manifold 306. The outlet duct 344 disposed in the second end 398 of the housing 399 of the manifold 306 in this example has two channels (channel A 350 and channel B 352) that are formed and separated by divider 348 disposed in the second end 398 of the housing 399. Divider 348 may be part of the housing 399 of the manifold 306. Alternatively, divider 348 may be a separate element that is coupled to the inner surface 310 of the outer wall 308 of the explosion-proof enclosure 302. In such a case, the divider may be coupled to the inner surface 310 of the outer wall 308 in one or more of any number of manners, including but not limited to using mating threads, bolting, welding, using epoxy, brazing, press fitting, mechanically connecting, using a flat joint, and using a serrated joint. In yet another exemplary alternative, the divider 348 is part of the outer wall 308 of the explosion-proof enclosure 302.

The divider 348 may be any shape and/or size suitable for directing the flow of the exhaust air to each of the channels in the (e.g., channel A 350, channel B 352) in the outlet duct 344 of the manifold 306. In this example, the divider 348 is shaped as a wedge that runs from the front of the manifold 306 (and, thus, the front of the explosion-proof enclosure 302) to the rear of the manifold 306. In this example, each top edge of the divider 348 aligns with the inner edge (inner edge A 362, inner edge B 363) of the apertures (aperture A 360, aperture B 361) that traverse the outer wall 308 of the explosion-proof enclosure 302.

As described in more detail below with respect to FIG. 4A, a bracket 370 overlaps the perimeter of the second end 398 of the housing 399 of the manifold 306 and couples the manifold 306 to the inner surface 310 of the outer wall 308 of the explosion-proof enclosure 302. A number of fastening devices 346 (in this example, bolts) are used to couple the bracket 370 to the inner surface 310 of the outer wall 308 of the explosion-proof enclosure 302.

In one or more exemplary embodiments, the apertures (aperture A 360, aperture B 361) that traverse the outer wall 308 of the explosion-proof enclosure 302 have varying sizes as the aperture traverses the outer wall 308. For example, as shown in FIG. 3C, the apertures (aperture A 360, aperture B 361) that traverse the inner surface 310 of the outer wall 308 widen about ⅓ of the way into the outer wall 308. At such a point, the size of the apertures correspond to the size of the frame (frame A 318, frame B 319) of the corresponding exhaust air filter assembly (exhaust air filter assembly A 312, exhaust air filter assembly B 313). The aperture traversing the outer wall 308 may also have the same size or a varying size (e.g., larger, smaller, varying between larger and smaller) in a horizontal plane between the inner surface 310 and the outer surface 311 of the outer wall 308.

Each exhaust air filter assembly (exhaust air filter assembly A 312, exhaust air filter assembly B 313) shown in FIG. 3C is substantially similar to the exhaust air filter assembly 312 described above with respect to FIG. 3B. Specifically, each exhaust air filter assembly (exhaust air filter assembly A 312, exhaust air filter assembly B 313) includes a cavity (cavity A 316, cavity B 317) inside a frame (frame A 318, frame B 319) and a filter (filter A 320, filter B 321) disposed within and coupled to the corresponding cavity. Each frame (frame A 318, frame B 319) in FIG. 3C includes threads (threads A 314, threads B 315) along its outer edges that mate with corresponding threads along the inner wall of the corresponding aperture in the outer wall 308. As a result, each exhaust air filter assembly (exhaust air filter assembly A 312, exhaust air filter assembly B 313) is threadably coupled to the corresponding aperture in the outer wall 308 of the explosion-proof enclosure 302.

Figure 4A:
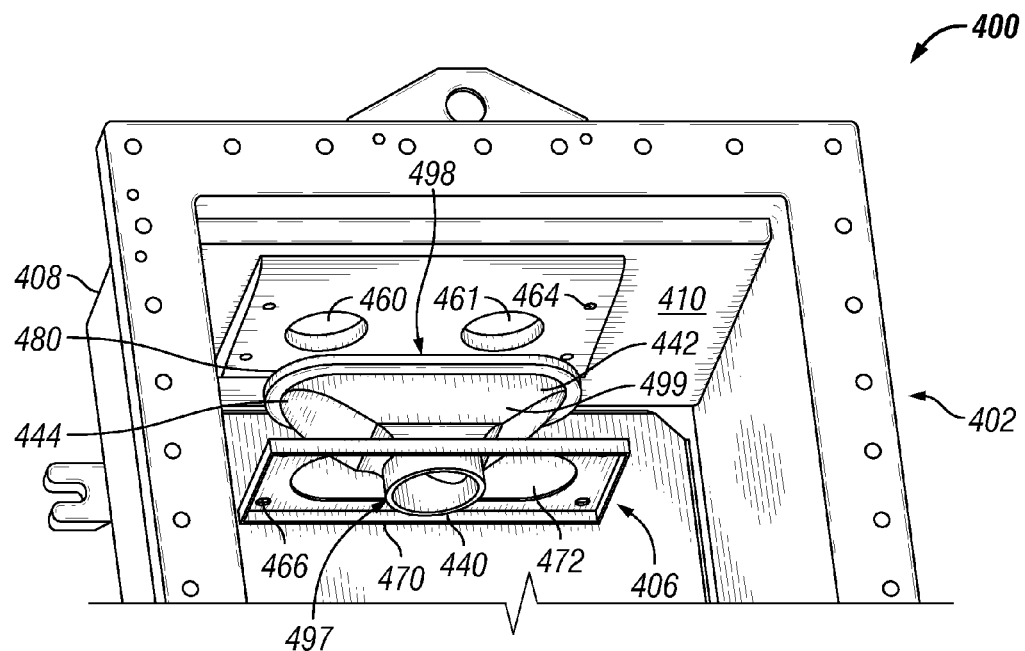
FIGS. 4A and 4B show a manifold for controlling airflow within an explosion-proof enclosure in accordance with one or more exemplary embodiments.
Figure 4B:
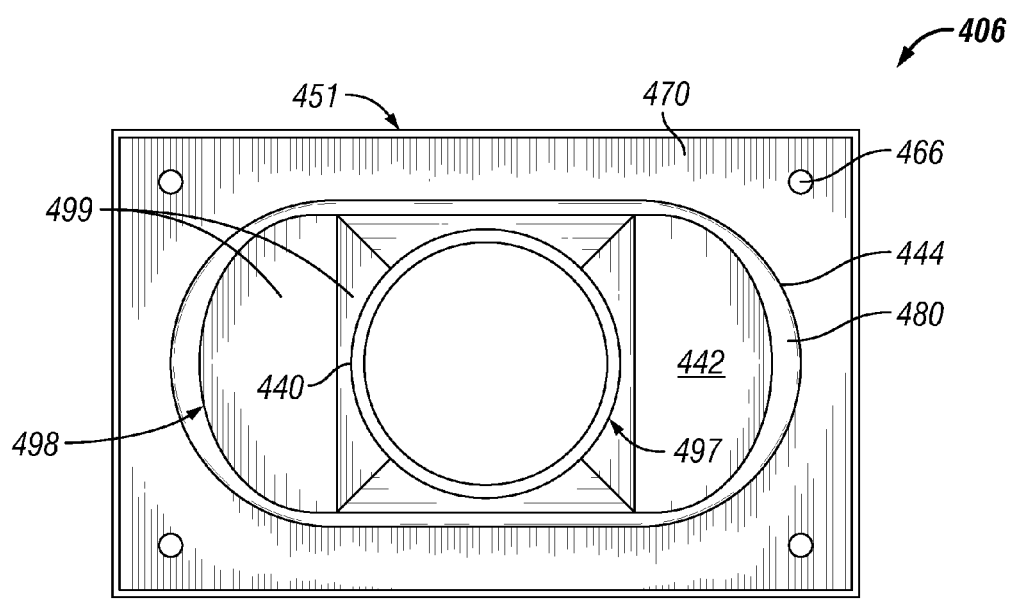

FIGS. 4A and 4B show an example system 400 of an explosion-proof enclosure in which airflow is controlled using a manifold in accordance with one or more exemplary embodiments. Features shown but not described and/or labeled in FIGS. 4A and 4B are described and/or labeled above with respect to FIGS. 2 through 3C. Exemplary embodiments of a manifold for controlling airflow inside an explosion-proof enclosure are not limited to the configuration shown in FIGS. 4A and 4B and discussed herein.

FIG. 4A shows a system 400 that includes a manifold 406 for controlling airflow within an explosion-proof enclosure 402 in accordance with one or more exemplary embodiments. The manifold 406 of FIG. 4A has a housing 499 inside of which are disposed three components. Specifically, the manifold 406 can include The first component includes the inlet duct 440 disposed within a first (e.g., bottom) end 497 of the housing 499, the body 442 disposed within the housing 499 adjacent to the inlet duct 440, and the outlet duct 444 disposed within a second (e.g., top) end 498 of the housing 499, which are substantially similar to the housing 399, the inlet duct 340, the body 342, and the outlet duct 344 described above with respect to FIGS. 3A through 3C. The manifold 406 also includes a gasket 480 and a bracket 470.

In one or more exemplary embodiments, the gasket 480 is configured to increase the integrity of the seal (and thus maintain the positive pressure) between the manifold 406 and the inner surface 410 of the outer wall 408 of the explosion-proof enclosure 402. The gasket 480 may be of any shape and/or size suitable for creating the seal between the manifold 406 and the inner surface 410. In this example of FIG. 4A, the gasket 480 is shaped approximately the same as the perimeter of the outlet duct 444. The gasket 480 also has a thickness. The gasket 480 may be made of one or more of a number of materials, including but not limited to rubber and plastic.

In one or more exemplary embodiments, the bracket 470 is configured to couple the manifold 406 to the inner surface 410 of the outer wall 408 of the explosion-proof enclosure 402. The bracket 457 may also be configured to increase the integrity of the seal (and thus maintain the positive pressure) between the manifold 406 and the inner surface 410 of the outer wall 408 of the explosion-proof enclosure 402. The bracket 470 may be substantially similar to the bracket 370 described above with respect to FIGS. 3B and 3C. In this example, the bracket 470 has a large aperture 472 in the middle of the bracket 470, where the large aperture 472 is sized to fit over the second end 498 of the housing 499 of the manifold 406, in which the outlet duct 444 is disposed. Further, the bracket 470 in FIG. 4A includes four receiving apertures 466 that are aligned with four receiving apertures 464 in the inner surface 410 of the outer wall 408 of the explosion-proof enclosure 402.

The second end 498 of the housing 499 of the manifold 406 in FIG. 4A is sized so that the perimeter of the second end 498 of the housing 499 of the manifold 406 encompasses two apertures (aperture A 460 and aperture B 461) in the inner surface 410 of the outer wall 408 of the explosion-proof enclosure 402. Aperture A 460 and aperture B 461 traverse the outer wall 408 and feed into an exhaust air filter assembly (not shown).

FIG. 4B shows a cross-sectional top view of the manifold 406 described above with respect to FIG. 4A. Specifically, FIG. 4B shows the housing 499, inside of which are disposed the inlet duct 440 vertically centered between the perimeter of the outlet duct 444, where the inlet duct 440 and the outlet duct 444 are coupled by a body 442. The gasket 480, having the same shape as the perimeter of the second end 498 of the housing 499 of the manifold 406, in which the outlet duct 444 is disposed, also has a definite width (e.g., 0.5 inches). The bracket 470 has four receiving apertures 466, one positioned toward each corner of the bracket 470. The bracket 470 also has its own perimeter 451, which is larger than the perimeter of the second end 498 of the housing 499 of the manifold 406, in which the outlet duct 444 is disposed.

In one or more exemplary embodiments, as shown in FIG. 4B, the inlet duct 440 is vertically centered at the center of the perimeter of the outlet duct 444. The inlet duct 440 may also be vertically centered at the center of the perimeter of the bracket 470. Further, when multiple channels exist in the outlet duct 444 (i.e., there are multiple apertures that traverse the outer wall of the explosion-proof enclosure), each of the channels may be spaced equidistantly from the center of the perimeter of the inlet duct 440, the outlet duct 444, and/or the bracket 470. Such symmetry may further improve flow of the exhaust air through the manifold 406 and reduce the occurrence of turbulence in the manifold 406.

In one or more exemplary embodiments, the housing 499 and/or bracket may be constructed of one or more materials that include, but are not limited to, rubber (e.g., ethylene propylene diene monomer rubber), metal, and plastic. Each of the aforementioned materials may be configured to withstand the pressure, temperature, air flow, and other operating conditions that exist inside the explosion-proof enclosure.

Figure 5:
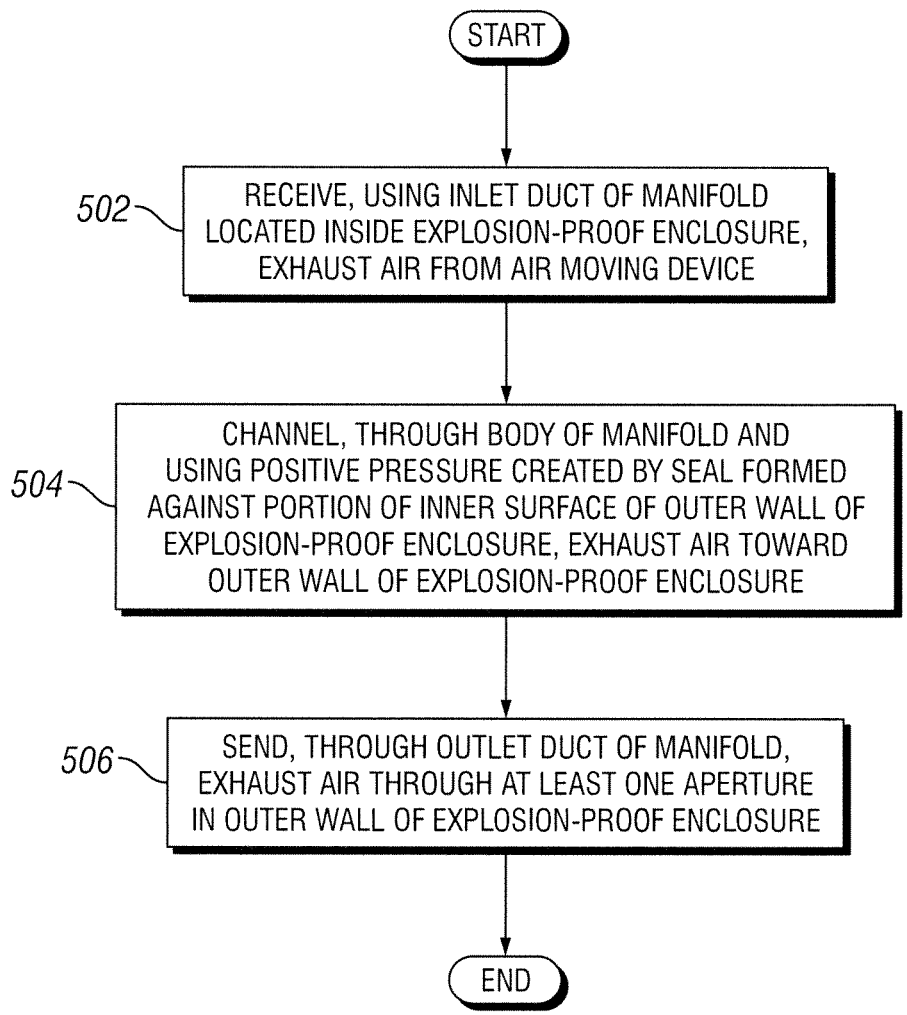
FIG. 5 shows a flowchart of a method for controlling flow of exhaust air through an explosion-proof enclosure using a manifold in accordance with one or more exemplary embodiments.

FIG. 5 shows a flowchart of a method for controlling the flow of exhaust air through an explosion-proof enclosure using a manifold in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments of the invention, one or more of the steps described below may be omitted, repeated, and/or performed in a different order. In addition, a person of ordinary skill in the art will appreciate that additional steps, omitted in FIG. 5, may be included in performing this method. Accordingly, the specific arrangement of steps shown in FIG. 5 should not be construed as limiting the scope of the invention.

In Step 502, the exhaust air is received from an air moving device. The exhaust air may be received from the air moving device using an inlet duct disposed in a first end of a housing of the manifold located inside an explosion-proof enclosure. The exhaust air may be generated by and received from the air moving device using one or more of a number of methods, including pressure differential, induction, and creating air flow with the air moving device (e.g., a fan, a blower).

In Step 504, the exhaust air is channeled toward the outer wall of the explosion-proof enclosure. The exhaust air may be channeled toward the outer wall through a body disposed in a portion of the housing, adjacent to the first end, of the manifold. Further, in one or more exemplary embodiments, the exhaust air is channeled toward the outer wall using a positive pressure within the manifold. In such a case, the positive pressure may be created by a seal formed between a second end of the housing of the manifold and a portion of an inner surface of an outer wall of the explosion-proof enclosure.

In one or more exemplary embodiments, the exhaust air is channeled using a divider to reduce turbulence of the exhaust air. In such a case, the divider may be positioned inside the manifold so that the exhaust air is substantially evenly distributed to a number of apertures through which the exhaust air exits the explosion-proof enclosure.

In Step 506, the exhaust air is sent through at least one aperture in the outer wall of the explosion-proof enclosure. The exhaust air may be sent through at least one aperture through an outlet duct disposed in the second end of the housing of the manifold. In one or more exemplary embodiments, the at least one aperture in the outer wall of the explosion-proof enclosure is located within the portion of the inner surface of the outer wall The at least one aperture in the outer wall of the explosion-proof enclosure may be traversed by and/or coupled to at least one exhaust air filter assembly. In such a case, the exhaust air may pass through the at least one air exhaust filter assembly to exit the explosion-proof enclosure. Further, in such a case, the size of the manifold (e.g., the perimeter of the outlet duct) to be smaller, particularly when each air exhaust filter assembly is large. As a result, a more compact design may be implemented. A benefit of such a compact design may include an ease in manufacturing.

The following description (in conjunction with FIGS. 1 through 5) describes an example in accordance with one or more exemplary embodiments. The example is for controlling flow of exhaust air inside an explosion-proof enclosure using a manifold. Terminology used in FIGS. 1 through 5 may be used in the example without further reference to FIGS. 1 through 5.

Example

Consider the following example, shown in FIGS. 6A through 6D, which describes controlling the flow of exhaust air through an explosion-proof enclosure using a manifold 606 in accordance with one or more exemplary embodiments described above. In this example, the manifold is substantially similar to the manifold described above with respect to FIGS. 3A through 4B.

Referring to FIGS. 6A through 6D, FIG. 6A shows that the air moving device 604 sends exhaust air 601 to the inlet duct 640 of the manifold 606. An air-tight seal may be formed where the first (e.g., bottom) end 697 of the housing 699 (where the inlet duct 640 is disposed) of the manifold 606 couples to the air moving device 604. In this example, the first end 697 of the housing 699 of the manifold 606 may be coupled to the air moving device 604 using an adhesive and a number of fastening devices (e.g., bolt). The inlet duct 640 disposed within the first end 697 of the housing 699 receives substantially 100% of the exhaust air 601 sent by the air moving device 604. The air moving device 604 may, at least in part, cause the exhaust air 601 to flow into and through at least a portion of the manifold 606.

Figure 6A:
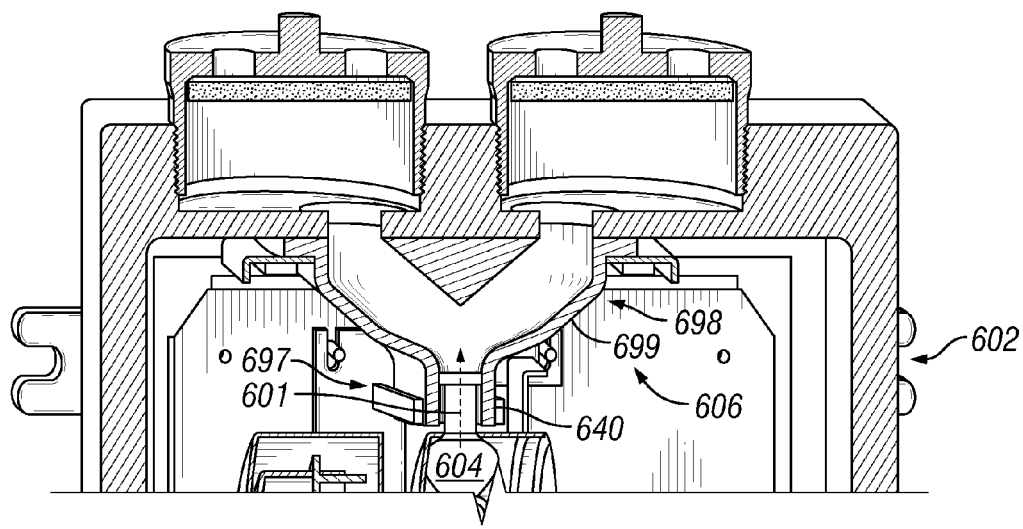
FIGS. 6A through 6D show an example in accordance with one or more exemplary embodiments.
Figure 6B:
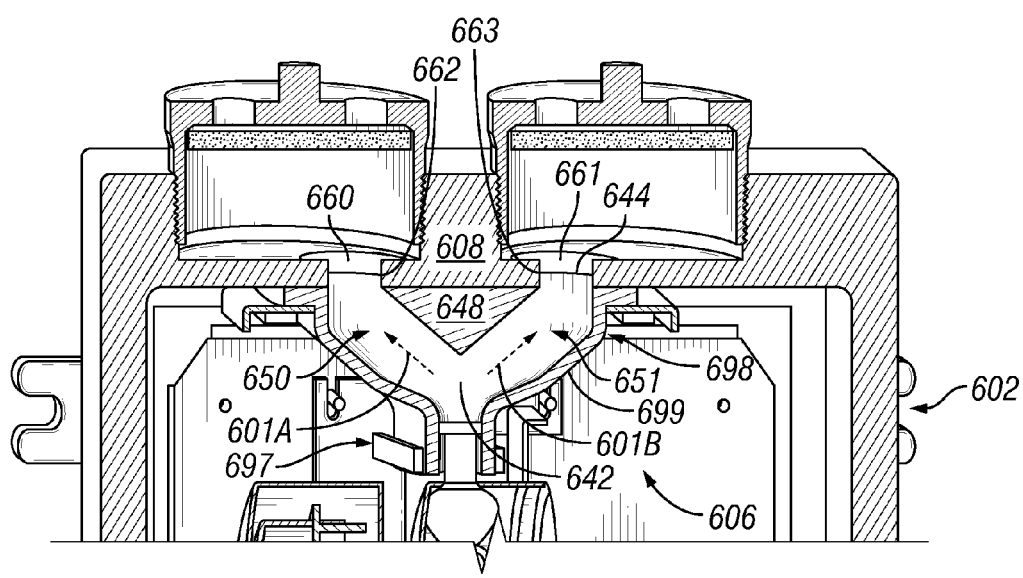

FIG. 6B shows the exhaust air 601 from FIG. 6A moving through the body 642 (disposed within a portion of the housing 699 adjacent to the first end 697) and the outlet duct 644 (disposed within a second (e.g., top) end 698 of the housing 699 adjacent to the first end 697) of the manifold 606. Specifically, as the exhaust air 601 travels into the body 642 and the outlet duct 644 of the manifold 606, the exhaust air 601 is split substantially evenly by the divider 648 that protrudes from the top end 698 of the manifold 606 (from along the perimeter of the outlet duct 644). Approximately half of the exhaust air 601A is channeled through channel A 650, and the remainder of the exhaust air 601B is channeled through channel B 651. Each top edge of the divider 648 aligns with the inner edge (inner edge A 662, inner edge B 663) of the apertures (aperture A 660, aperture B 661) that traverse the outer wall 608 of the explosion-proof enclosure 602.

Figure 6C:
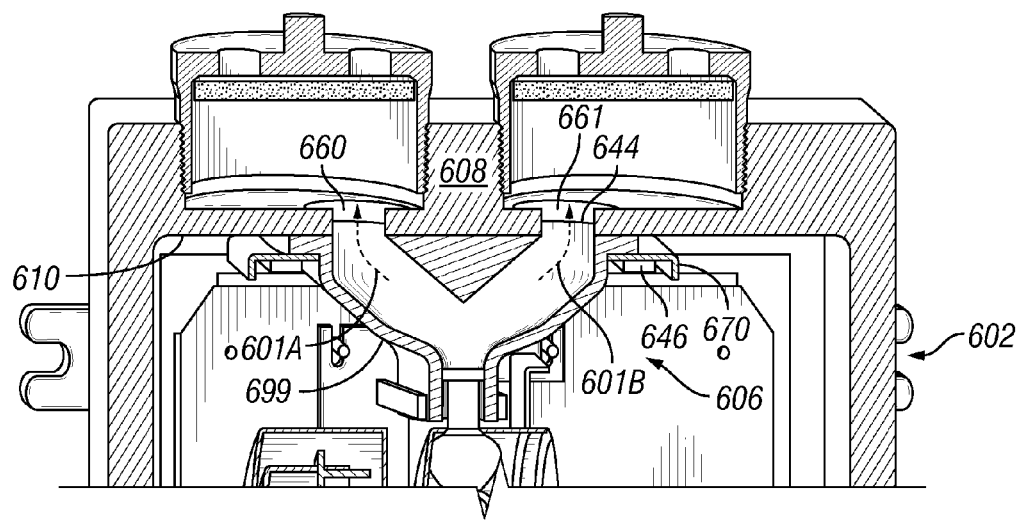

FIG. 6C shows the exhaust air exiting the manifold 606. Specifically, FIG. 6C shows exhaust air 601A being sent from the left side of the outlet duct 644 through aperture A 660. Further exhaust air 601B is sent from the right side of the outlet duct 644 through aperture B 661. The outlet duct 644 of the manifold 606 forms a seal against the inner surface 610 of the outer wall 608 of the explosion-proof enclosure 602. Specifically, a bracket 670 overlaps the outlet duct 644 and is coupled to the inner surface 610 using a number of fastening devices 646 that traverse receiving apertures in the bracket 670. The seal created by the manifold 606 against the inner surface 610 may cause a positive pressure, which may (at least in part) generate the flow of the exhaust air through the manifold 606 to outside the explosion-proof enclosure 602.

Figure 6D:
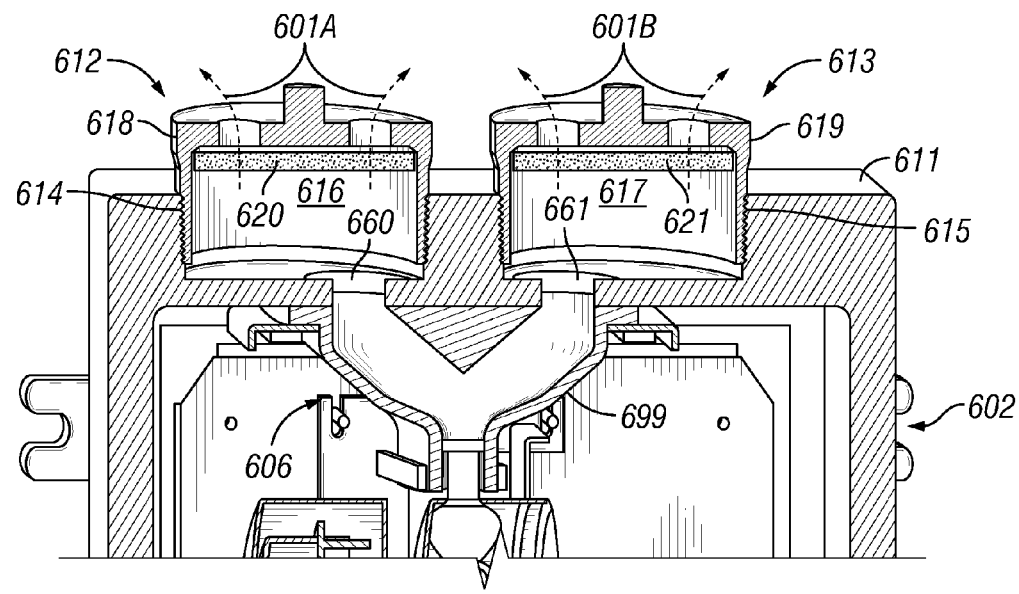

FIG. 6D shows the exhaust air exiting the explosion-proof enclosure 602. Specifically, exhaust air 601A flows from aperture A 660 through exhaust air filter assembly A 612 to outside the explosion-proof enclosure 602. Likewise, exhaust air 601B flows from aperture B 661 through exhaust air filter assembly B 613 to outside the explosion-proof enclosure 602. The top portions of exhaust air filter assembly A 612 and exhaust air filter assembly B 613 protrude above the outer wall 608 of the explosion-proof enclosure 602.

Within exhaust air filter assembly A 612, the exhaust air 601A flows from aperture A 660, through cavity A 616, through filter A 620 of exhaust air filter assembly A 612, and outside exhaust air filter assembly A 612 and the explosion-proof enclosure 602. Similarly, the exhaust air 601B flows from aperture B 661, through cavity B 617, through filter B 621 of exhaust air filter assembly B 613, and outside exhaust air filter assembly B 613 and the explosion-proof enclosure 602. In this example, frame A of exhaust air filter assembly A 612 is coupled to aperture A 660 in the outer wall 608 using mating threads A 614. Similarly, frame B of exhaust air filter assembly B 613 is coupled to aperture B 661 in the outer wall 608 using mating threads B 615.

One or more exemplary embodiments provide for controlling the flow of exhaust air through an explosion-proof enclosure using a manifold. Specifically, one or more exemplary embodiments are configured to use a manifold to receive exhaust air from one or more air moving devices located inside the explosion-proof enclosure, channel the exhaust air toward one or more apertures in an outer wall of the explosion-proof enclosure, and send the exhaust air through the one or more apertures in the outer wall of the explosion-proof enclosure and outside the explosion-proof enclosure.

Exemplary embodiments described herein may control the flow of exhaust air through the manifold inside the explosion-proof enclosure by using positive pressure. The positive pressure may be created by forming a seal between an outlet duct of the manifold and a portion of the inner surface of the outer wall of the explosion-proof enclosure. Consequently, exemplary embodiments described herein may not require additional mechanical equipment to control the flow of exhaust air through the manifold, which yields a number of benefits including but not limited to lowering equipment and maintenance costs, allowing for easier maintenance, and increasing reliability.

Using one or more exemplary embodiments, the exhaust air passes through one or more exhaust air filter assemblies at a rate of at least 175 cubic feet per minute when the explosion-proof enclosure is size 2 and when one or more heat-generating components in the explosion-proof enclosure generate heat at 50° C. In so doing, the temperature inside the explosion-proof enclosure is sufficiently maintained by controlling the flow of exhaust air through the explosion-proof enclosure using a manifold according to one or more exemplary embodiments.

Using one or more exemplary embodiments, the exhaust air passes through one or more exhaust air filter assemblies at a rate of at least 75 cubic feet per minute when the explosion-proof enclosure is size 1 and when one or more heat-generating components in the explosion-proof enclosure generate heat at 50° C. In so doing, the temperature inside the explosion-proof enclosure is sufficiently maintained by controlling the flow of exhaust air through the explosion-proof enclosure using a manifold according to one or more exemplary embodiments.

Although controlling the flow of exhaust air inside an explosion-proof enclosure using a manifold is described with reference to preferred embodiments, it should be appreciated by those skilled in the art that various modifications are well within the scope of controlling the flow of exhaust air inside an explosion-proof enclosure using a manifold. From the foregoing, it will be appreciated that an embodiment of controlling the flow of exhaust air inside an explosion-proof enclosure using a manifold overcomes the limitations of the prior art. Those skilled in the art will appreciate that controlling the flow of exhaust air inside an explosion-proof enclosure using a manifold is not limited to any specifically discussed application and that the exemplary embodiments described herein are illustrative and not restrictive. From the description of the exemplary embodiments, equivalents of the elements shown therein will suggest themselves to those skilled in the art, and ways of constructing other embodiments of controlling the flow of exhaust air inside an explosion-proof enclosure using a manifold will suggest themselves to practitioners of the art. Therefore, the scope of controlling the flow of exhaust air inside an explosion-proof enclosure using a manifold is not limited herein.

What is claimed is:

1. A manifold within an explosion-proof enclosure, the manifold comprising:
   a housing having a first end and a second end, wherein the second end abuts against an inner surface of an outer wall of the explosion-proof enclosure;
   an inlet duct coupled to an air moving device and disposed within the first end of the housing, wherein the inlet duct is configured to receive exhaust air from the air moving device;
   an outlet duct comprising a first perimeter and at least one channel, wherein the outlet duct is disposed within the second end of the housing, wherein the outlet duct is configured to send the exhaust air outside the explosion-proof enclosure, wherein the first perimeter of the outlet duct is coupled to a first portion of the inner surface of the outer wall of the explosion-proof enclosure, wherein the first portion of the inner surface comprises at least one aperture that traverses the outer wall;
   a body comprising a cavity and disposed within the housing between the first end and the second end of the housing, wherein the body couples the inlet duct to the at least one channel, and wherein the exhaust air flows from the inlet duct through the cavity to the outlet duct; and
   a bracket that abuts against and overlaps an outer surface of the outlet duct adjacent to the first perimeter of the outlet duct to secure the outlet duct to the explosion-proof enclosure, wherein the bracket is coupled to a second portion of the inner surface of the outer wall of the explosion-proof enclosure, wherein the second portion encompasses the first portion,
   wherein the explosion-proof enclosure, when the bracket abuts against and overlaps the outer surface of the outlet duct, and when the bracket abuts against and is coupled to the inner surface of the outer wall of the explosion-proof enclosure, meets applicable industry standards for the explosion-proof enclosure.

2. The manifold of claim 1, wherein the bracket further comprises a plurality of first fastening receivers positioned between a second perimeter of the bracket and the first perimeter of the outlet duct, wherein the plurality of first fastening receivers are configured to receive a plurality of fastening devices, wherein the plurality of fastening devices are configured to couple the bracket and the housing to the second portion of the inner surface of the outer wall of the explosion-proof enclosure.

3. The manifold of claim 2, wherein the bracket forms a seal against the second portion of the inner surface of the outer wall of the explosion-proof enclosure, wherein the seal creates a positive pressure within the explosion-proof enclosure.

4. The manifold of claim 2, further comprising:
   a gasket positioned between the second perimeter of the bracket and the second portion of the inner surface of the outer wall of the explosion-proof enclosure.

5. The manifold of claim 4, wherein the plurality of fastening devices are further configured to traverse a plurality of second fastening receivers in the gasket.

6. The manifold of claim 1, further comprising:
   a gasket positioned between the first perimeter of the outlet duct and the first portion of the inner surface of the outer wall of the explosion-proof enclosure.

7. The manifold of claim 1, wherein at least one exhaust air filter assembly is coupled to and traverses the at least one aperture in the outer wall of the explosion-proof enclosure, wherein the at least one exhaust air filter assembly is located within the first perimeter in the first portion, and wherein the least one exhaust air filter assembly is configured to receive the exhaust air from the at least one channel of the outlet duct and send the exhaust air outside of the explosion-proof enclosure.

8. The manifold of claim 7, wherein the exhaust air sent outside of the explosion-proof enclosure has a first temperature, wherein the first temperature is less than a second temperature of the exhaust air entering the inlet duct of the manifold.

9. The manifold of claim 7, wherein the at least one exhaust air filter assembly comprises a sintered material.

10. The manifold of claim 7, wherein the at least one exhaust air filter assembly is threadably coupled to the at least one aperture in the outer wall of the explosion-proof enclosure.

11. The manifold of claim 1, wherein the housing is constructed from at least one material selected from a group consisting of rubber, metal, and plastic.

12. The manifold of claim 11, wherein when the housing is constructed from rubber, the rubber comprises ethylene propylene diene monomer rubber.

13. The manifold of claim 1, wherein the inlet duct is vertically centered at a center of the first perimeter.

14. The manifold of claim 13, wherein the at least one channel comprises a plurality of channels, wherein each channel of the plurality of channels is spaced equidistantly from the center of the first perimeter.

15. The manifold of claim 14, wherein the at least one channel comprises a plurality of channels, wherein the housing further comprises at least one divider disposed at the second end of the housing, wherein the at least one divider separates each of the plurality of channels and is configured to increase flow of the exhaust air to the outlet duct.

16. A method for controlling flow of exhaust air through an explosion-proof enclosure using a manifold, the method comprising:
   receiving, using an inlet duct disposed in a first end of a housing of the manifold, the exhaust air, wherein the manifold is located inside the explosion-proof enclosure, wherein the exhaust air is generated by an air moving device;
   channeling, through a body disposed in a portion of the housing of the manifold adjacent to the first end and using a positive pressure created by a seal formed between a second end of the housing of the manifold and a portion of an inner surface of an outer wall of the explosion-proof enclosure, the exhaust air toward the outer wall of the explosion-proof enclosure; and
   sending, through an outlet duct disposed in the second end of the housing of the manifold, the exhaust air through at least one aperture in the outer wall of the explosion-proof enclosure, wherein the at least one aperture in the outer wall of the explosion-proof enclosure is located within the portion of the inner surface of the outer wall, wherein a second end of the housing of the manifold abuts against the inner surface of the outer wall of the explosion-proof enclosure, wherein the first perimeter of the outlet duct is encompassed by a bracket of the manifold, wherein the bracket abuts against and overlaps an outer surface of the outlet duct adjacent to the first perimeter of the outlet duct to secure the outlet duct to the explosion-proof enclosure, wherein the bracket is coupled to the inner surface of the outer wall of the explosion-proof enclosure, wherein the explosion-proof enclosure, when the bracket of the manifold abuts against and overlaps the outer surface of the outlet duct, and when the bracket is coupled to the inner surface of the outer wall of the explosion-proof enclosure, meets applicable industry standards for an explosion-proof enclosure.

17. The method of claim 16, wherein the at least one aperture in the outer wall of the explosion-proof enclosure is traversed by and coupled to at least one exhaust air filter assembly, wherein the exhaust air passes through the at least one air exhaust filter assembly to exit the explosion-proof enclosure.

18. The method of claim 16, wherein the exhaust air is channeled using a divider to reduce turbulence of the exhaust air.

19. The method of claim 16, wherein the seal is formed using the bracket that secures the outlet duct of the manifold against the inner surface of the outer wall of the explosion-proof enclosure.

* * * * *